(12) United States Patent
Huang et al.

(10) Patent No.: US 8,754,623 B2
(45) Date of Patent: Jun. 17, 2014

(54) SYSTEM AND METHOD FOR CURRENT LIMITING A DC-DC CONVERTER

(71) Applicant: Intersil Americas LLC, Milpitas, CA (US)

(72) Inventors: Congzhong Huang, Plano, TX (US); Sicheng Chen, Plano, TX (US); Xuelin Wu, Plano, TX (US)

(73) Assignee: Intersil Americas, Inc., Milpitas, CA (US)

( * ) Notice: Subject to any disclaimer, the term of this patent is extended or adjusted under 35 U.S.C. 154(b) by 0 days.

(21) Appl. No.: 13/687,090

(22) Filed: Nov. 28, 2012

(65) Prior Publication Data
US 2013/0088209 A1    Apr. 11, 2013

Related U.S. Application Data

(63) Continuation of application No. 13/052,820, filed on Mar. 21, 2011, now Pat. No. 8,334,683.

(60) Provisional application No. 61/376,536, filed on Aug. 24, 2010.

(51) Int. Cl.
*G05F 1/44* (2006.01)

(52) U.S. Cl.
USPC .......................................................... 323/283

(58) Field of Classification Search
USPC ................. 323/271–273, 275, 351, 282–285
See application file for complete search history.

(56) References Cited

U.S. PATENT DOCUMENTS

| | | | | |
|---|---|---|---|---|
| 6,064,187 A * | 5/2000 | Redl et al. | | 323/285 |
| 6,163,142 A * | 12/2000 | Tsujimoto | | 323/283 |
| 6,172,550 B1 * | 1/2001 | Gold et al. | | 327/366 |
| 6,229,292 B1 * | 5/2001 | Redl et al. | | 323/285 |
| 6,424,207 B1 * | 7/2002 | Johnson | | 327/552 |
| 7,095,183 B2 * | 8/2006 | Alexandrov | | 315/224 |
| 7,235,955 B2 * | 6/2007 | Solie et al. | | 323/222 |
| 7,274,174 B2 * | 9/2007 | Wang et al. | | 323/224 |
| 7,595,624 B2 * | 9/2009 | Tateishi et al. | | 323/288 |
| 7,714,556 B2 * | 5/2010 | Chu et al. | | 323/282 |

(Continued)

FOREIGN PATENT DOCUMENTS

EP    1850468    10/2007

OTHER PUBLICATIONS

Linear Technology (2005) "High Efficiency, Synchronous, 4-Switch Buck-Boost Controller;" Linear Technology Announcement Document LTC3780, H02M3/158B, H02M3/158S; pp. 1-28.

(Continued)

*Primary Examiner* — Adolf Berhane
(74) *Attorney, Agent, or Firm* — Graybeal Jackson LLP

(57) ABSTRACT

A DC-DC voltage converter has a pair of switching transistors to provide an output voltage and are alternately switched in a boost mode of operation responsive to control signals. An inductor is connected to the pair of switching transistor and has an inductor current flowing there through. A current sensor monitors an input current and generates a current sense signal responsive thereto. Control circuitry generates the control signals to the second pair of switching transistors responsive to the current sense signal, the output voltage and a current limit signal, wherein when the current limit signal indicates the inductor current exceeds a current limit the control signals configure the pair of switching transistors to decrease the inductor current.

17 Claims, 10 Drawing Sheets

(56) References Cited

U.S. PATENT DOCUMENTS

| | | | |
|---|---|---|---|
| 7,893,665 B2* | 2/2011 | Belch | 323/222 |
| 7,923,858 B2* | 4/2011 | Ito et al. | 307/9.1 |
| 7,994,827 B2* | 8/2011 | Williams | 327/110 |
| 8,013,585 B2* | 9/2011 | Yamada | 323/285 |
| 8,018,208 B1* | 9/2011 | Kahn et al. | 323/224 |
| 8,022,680 B2* | 9/2011 | Ryoo | 323/282 |
| 8,334,683 B2* | 12/2012 | Huang et al. | 323/283 |
| 2004/0113594 A1 | 6/2004 | Athari | |
| 2009/0015229 A1 | 1/2009 | Kotikalapoodi | |
| 2010/0148741 A1* | 6/2010 | Chen et al. | 323/285 |

OTHER PUBLICATIONS

Zhou et al (2010) "Symmetrical Dynamics of Peak Current-Mode and Valley Current-Mode Controlled Switching DC-DC Converters With Ramp Compensation;" Chinese Physics B; 19:1-8.

European Search Report for EP11176780; Issued Jul. 2, 2013.

\* cited by examiner

SYSTEM AND METHOD FOR CURRENT LIMITING A DC-DC CONVERTER

CROSS-REFERENCE TO RELATED APPLICATIONS

This application is a continuation of U.S. patent application Ser. No. 13/052,820, filed Mar. 21, 2011, entitled SYSTEM AND METHOD FOR CURRENT LIMITING A DC-DC CONVERTER) which claims benefit of U.S. Provisional Application No. 61/376,536, filed Aug. 14, 2010, entitled SYSTEM AND METHOD FOR CONTROLLING BUCK-BOOST CONVERTER WITH CURRENT LIMIT SIGNAL, the specifications of which are incorporated herein in their entirety.

BRIEF DESCRIPTION OF THE DRAWINGS

For a more complete understanding, reference is now made to the following description taken in conjunction with the accompanying Drawings in which:

FIG. 3b illustrates an alternative implementation of the circuit of FIG. 3a;

FIG. 7b illustrates an alternative embodiment of the circuit of FIG. 7a; and

DETAILED DESCRIPTION

Figure 1:
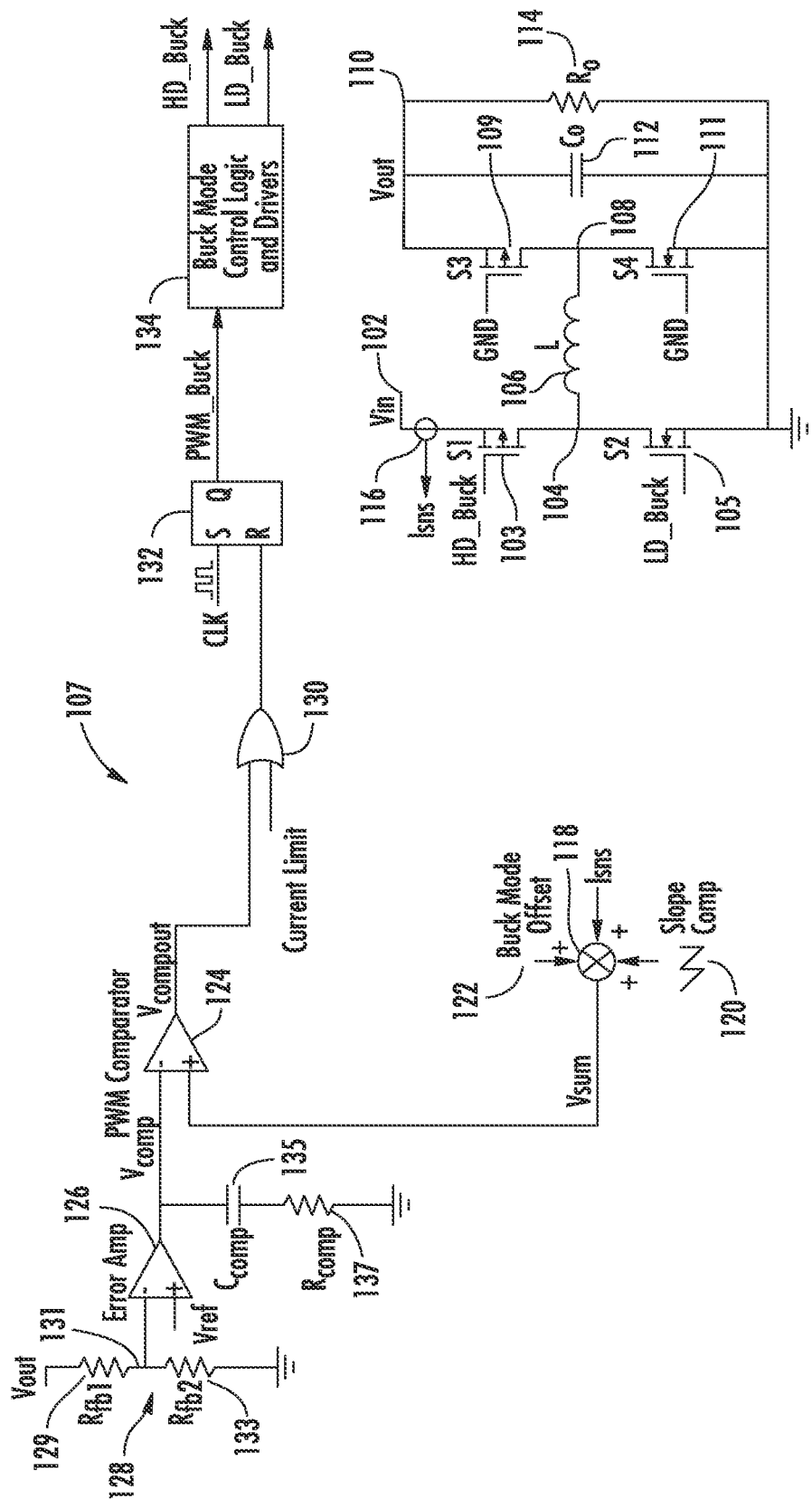
FIG. 1 is a schematic diagram of a DC-DC converter in a buck mode of operation.

Referring now to the drawings, wherein like reference numbers are used herein to designate like elements throughout, the various views and embodiments of a system and method for controlling buck-boost converter with current limit signal are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

DC-DC converters enable the operation of a voltage regulator in situations wherein the input voltage may be either greater than the output voltage or wherein the output voltage is greater than the input voltage, or both. In a boost mode of operation, the input voltage is at a lower level than the regulated output voltage level. In the buck mode of operation, the input voltage is at a higher voltage level than the regulated output voltage level. Within present configurations for DC-DC converters when the converter is limiting the peak current through the inductor of the DC-DC converter, fast switching frequencies within the converter power switches or large inductor current ripples within the inductor current may be experienced. A control scheme enabling the limiting of the peak current within a DC-DC converter that does not change the switching frequency and provides a constant inductor current ripple condition would be highly desirable.

Referring now to the drawings, and more particularly to FIG. 1, there is illustrated a schematic diagram of a DC-DC converter that is operating in the buck mode of operation. While a buck-boost converter is illustrated, other types of DC/DC converters may be used. The input voltage $V_{IN}$ is applied at an input voltage node 102 to the source of a first switching transistor 103. The source/drain path of switching transistor 103 is connected between the input voltage node 102 and node 104. A second switching transistor 105 has its drain/source path connected between node 104 and ground. The gate of switching transistor 103 is connected to receive the HD_BUCK PWM control signal from control circuitry 107. The gate of transistor 105 is connected to receive the LD_BUCK control signal from the control circuitry 107. Inductor 106 is connected between node 104 and node 108. Switching transistor 109 has its source/drain path connected between the output voltage node 110 and node 108. Switching transistor 111 has its drain/source path connected between node 108 and ground. The gates of each of switching transistors 109 and 111 are connected to ground when the buck-boost converter is in the buck mode of operation. An output capacitor 112 is connected between node 110 and ground, and a resistor 114 is connected in parallel with capacitor 112 between node 110 and ground.

A current sensor 116 monitors the input current at the input voltage node 102 and generates a voltage signal ISNS responsive thereto. The input current sense voltage ISNS is combined with a slope compensation signal 120 and a buck mode offset signal 122 within a summation circuit 118. The slope compensation signal 120 is used for eliminating the subharmonic oscillations. The buck mode offset signal 122 is determined from a preset value. The summation circuit 118 combines the sensed current signal ISNS with the sloped compensation signal 120 and the buck mode offset signal 122. The result of this combination provides a control signal VSUM which is provided to a non-inverting input of a PWM comparator 124. The inverting input of the PWM comparator 124 is connected to receive a voltage error signal V COMP from a GM error amplifier 126. The GM error amplifier 126 is connected to a resistor divider network 128 at its inverting input that monitors the output voltage VOUT provided from the output voltage node 110. The resistor divider 128 includes a first resistor 129 connected between the output voltage node 110 and node 131. A resistor 133 is connected between node 131 and ground. The non-inverting input of the GM amplifier 126 is connected to receive a reference voltage VREF to which the monitored output voltage from the resistor divider 128 is compared. The output of the GM amplifier 126 is connected to a compensation circuit consisting of a series connection of a capacitor 135 and a resistor 137 connected between the output of the GM amplifier 126 and ground.

The output of the PWM comparator 124 provides a V.sub.COMPOUT signal to a first input of OR gate 130. The other input of OR gate 130 is connected to receive the current limit signal from a current limit comparator (not shown). The output of the OR gate 130 is provided to the R input of an SR latch 132. The S input of the SR latch 132 is connected to a clock signal (CLK). The output Q of the SR latch 132 comprises the PWM _BUCK signal that is provided to the buck mode control logic and driver 134. The buck mode control logic and drivers 134 generate the HD_BUCK and LD_BUCK signals that are provided to the gates of switching transistors 103 and 105 and control their switching during the buck mode of operation. mode control logic and drivers 134 generate the HD_BUCK and LD_BUCK signals that are provided to the gates of switching transistors 103 and 105 and control their switching during the buck mode of operation.

Figure 2:
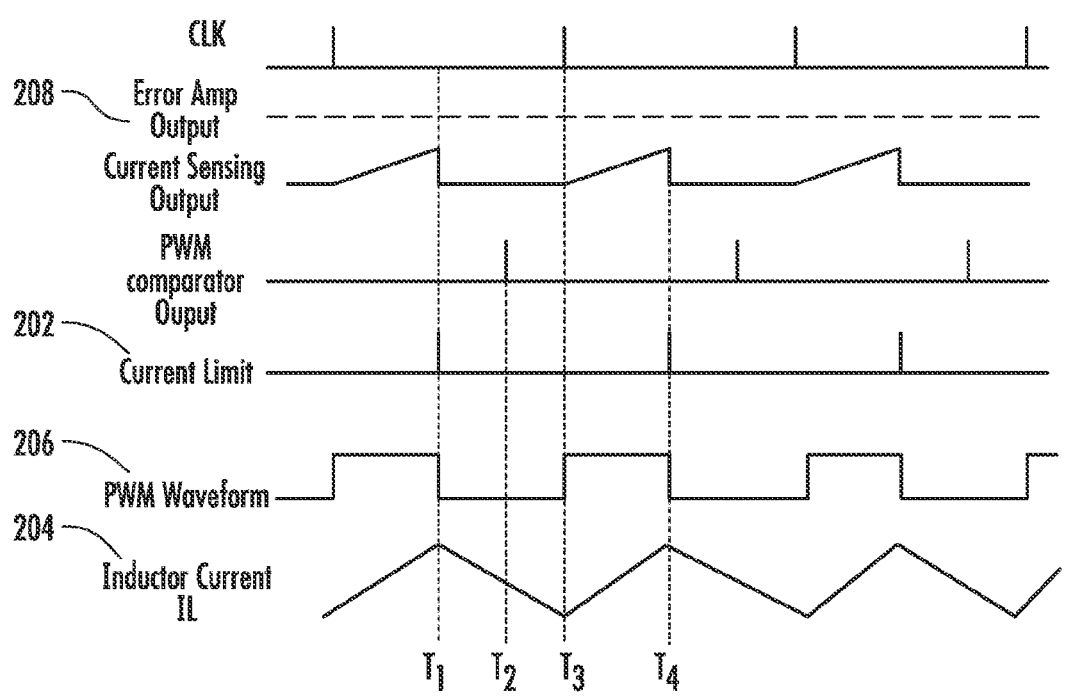
FIG. 2 illustrates a number of waveforms associated with the operation of the DC-DC converter of FIG. 1 in the buck mode of operation.

When operating in the buck mode of operation, the buck-boost converter uses a peak current control scheme. Referring now to FIG. 2, there are illustrated the various waveforms associated with the operation of the buck-boost converter in the buck mode of operation. Within the peak current mode control scheme, the rising edge of the current limit signal 202 at time $T_1$ occurs during the "on" time of the switching transistor 103 and the "off" time of the switching transistor 105. Responsive to the current limit signal pulse at time $T_1$, the switching transistor 103 is turned "off" and the low side switching transistor 105 is turned "on." Thus, at time $T_1$, the inductor current $I_L$ 204 changes from a positive slope prior to time $T_1$ to a negative slope after time $T_1$, and the inductor current begins to decrease from time $T_1$ to time $T_3$.

The current limit signal 202 replaces the PWM comparator output $V_{OUT}$ that is applied to the input of the SR latch 132 during the current limit event. This causes the PWM waveform 206 to go to a logical "low" level at time $T_1$. The current limit 202 modulates the switching transistor 103 "on" time to limit the inductor current from increasing past time $T_1$ and protect the buck-boost converter. Upon receipt of a next clock signal at time $T_3$, the PWM waveform goes to a logical "high" level at time $T_3$ causing transistor 103 to be turned "on" and transistor 105 to be turned "off". This causes the inductor current 204 to begin increasing at time $T_3$. Additionally, the output of the error amplifier output 208 will begin increasing responsive to the increase in the output voltage $V_{OUT}$ caused by the increased inductor current. The PWM comparator output pulse has no effect at this condition. It is replaced by the current limit signal. The inductor current 204 and error amplifier output 208 continue to increase until time $T_4$ when a next current limit pulse is received at time $T_4$. The process will then repeat itself. This is a typical control scheme for current control and will not cause frequency or inductor current ripple changes.

Figure 3A:
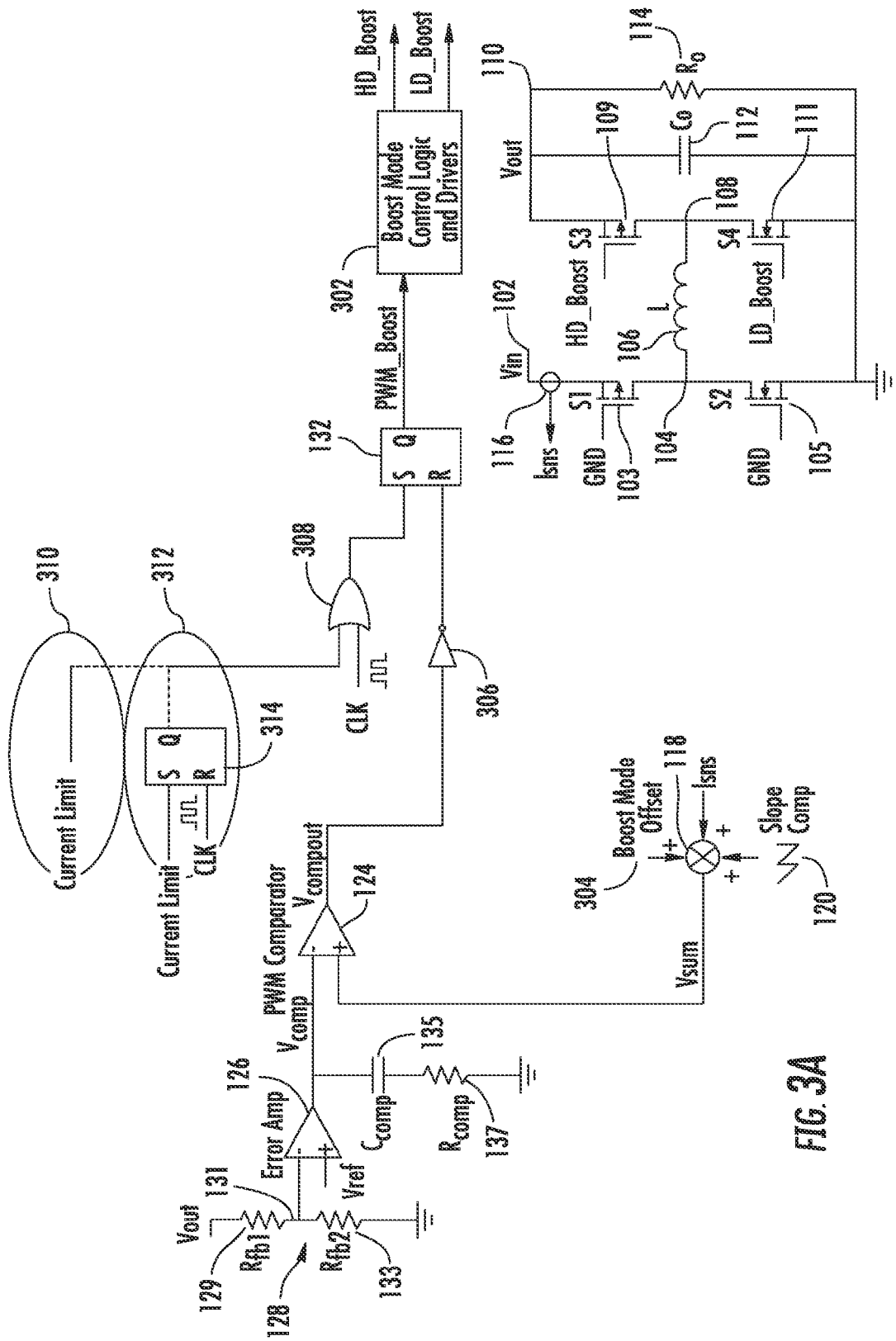
FIG. 3a illustrates the operation of the DC-DC converter of FIG. 1 in a boost mode of operation using a current limit signal.

Referring now to FIG. 3A there is illustrated a schematic diagram of a buck-boost converter in a boost mode of operation using valley current mode control. The input voltage V.sub.IN is applied at an input voltage node 102 to the source of a first switching transistor 103. The source/drain path of switching transistor 103 is connected between the input voltage node 102 and node 104. A second switching transistor 105 has its drain/source path connected between node 104 and ground. The gate of switching transistor 109 is connected to receive the HD_BOOST PWM control signal from control circuitry 107. The gate of transistor 111 is connected to receive the LD_BOOST control signal from the control circuitry 107. Inductor 106 is connected between node 104 and node 108. Switching transistor 109 has its source/drain path connected between the output voltage node 110 and node 108. Switching transistor 111 has its drain/source path connected between node 108 and ground. The gates of each of switching transistors 103 and 105 are connected to ground when the buck-boost converter is in the boost mode of operation. The output capacitor 112 is connected between node 110 and ground, and a resistor 114 is connected in parallel with capacitor 112 between node 110 and ground.

The current sensor 116 monitors the input current at the input voltage node 102 and generates a voltage signal ISNS responsive thereto. The input current sense voltage ISNS is combined with slope compensation signal 120 and a boost mode offset signal 304 within summation circuit 118. The slope compensation signal 120 is used for eliminating a sub-harmonic oscillation And the buck mode offset signal 122 is determined from a preset value as previously discussed. The summation circuit 118 combines the sensed current signal ISNS with the sloped compensation signal 120 and the buck mode offset signal 122. The result of this combination provides a control signal VSUM which is provided to a non-inverting input of the PWM comparator 124. The inverting input of the PWM comparator 124 is connected to receive voltage error signal V.sub.COMP from GM error amplifier 126. The GM error amplifier 126 is connected to resistor divider network 128 at its inverting input that monitors the output voltage V.sub.OUT provided from the output voltage node 110. The resistor divider 128 includes a first resistor 129 connected between the output voltage node 110 and node 131. Resistor 133 is connected between node 131 and ground. The non-inverting input of the GM amplifier 126 is connected to receive a reference voltage V.sub.REF to which the monitored output voltage from the resistor divider 128 is compared. The output of the GM error amplifier 126 is connected to the compensation circuit consisting of a series connection of a capacitor 135 and a resistor 137 connected between the output of the GM amplifier 126 and ground.

The output of the PWM comparator 124 provides the V.sub.COMPOUT signal to an input of inverter 306. The output of the inverter 306 is provided to the R input of SR latch 132. The S input of the SR latch 132 is connected to an output of OR gate 308. The output Q of the SR latch 132 comprises the PWM_BOOST signal that is provided to the boost mode control logic and driver 302. The boost mode control logic and drivers 302 generate the HD_BOOST and LD_BOOST signals that are provided to the gates of switching transistors 109 and 111 and control their switching during the boost mode of operation.

The boost mode control logic and drivers 302 provides the HD_BOOST and LD_BOOST control signals to the switching transistors 109 and 111, respectively, responsive to the PWM_BOOST signal received from SR latch 132. The R input of the SR latch 132 is connected to the output of an inverter 306 that inverts the V.sub.COMPOUT signal from the output of PWM comparator 124. The S input of the SR latch 308 is connected to the output of an OR gate 308. The first input of OR gate 308 is connected to a clock signal (CLK) while the second input of the OR gate 308 is connected to receive a current limit signal. The current limit signal provided to the input of the OR gate 308 may be provided in one of two manners. In a first embodiment, the current limit signal as indicated generally at 310 is provided directly to the input of the OR gate 308. In a second embodiment, the input of OR gate 308 is connected to the Q output of an SR latch 314. The S input of the SR latch 314 is connected to receive the current limit signal while the R input of the SR latch 314 is connected to receive the clock signal CLK.

When in the boost mode of operation using a current limit, the switching transistors 103 and 105 have their gates connected to ground (see FIG. 3A) such that these transistors are turned off. The gates of switching transistors 109 and 111 are connected to receive the HD_BOOST and LD_BOOST control signals from the output of the boost mode control logic and drivers 302 to alternatively switch these transistors "on" and "off". The configuration illustrated in FIG. 3A comprises a valley current mode control scheme. The valley current control scheme adds challenges during a current limit event because a current limit rising edge occurs during an inductor current rising period and in order to provide valley mode current control, the output of the PWM comparator takes effect only while the inductor current is falling.

Figure 3B:
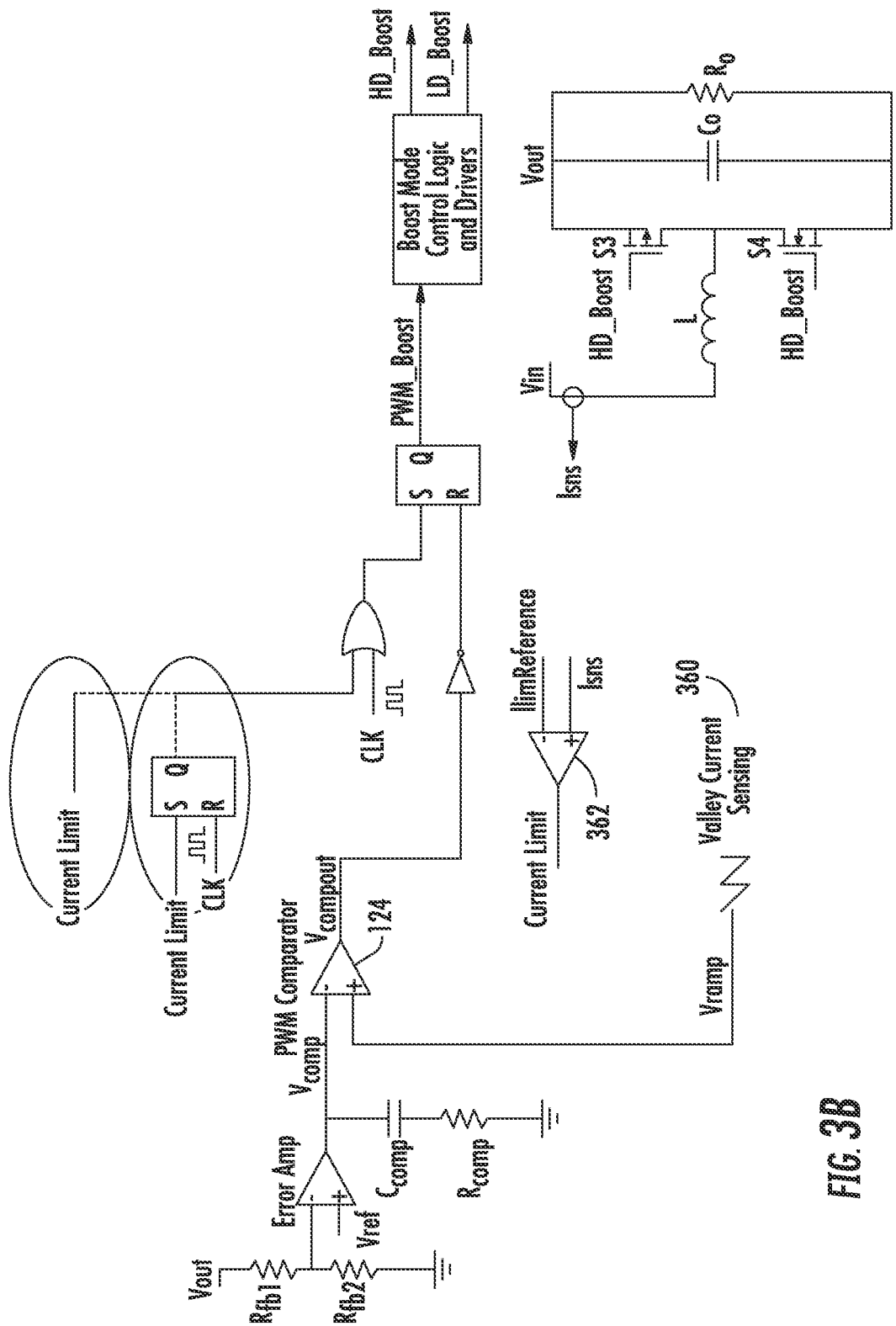

Referring now to FIG. 3B, there is illustrated a schematic diagram of a DC-DC converter in the boost mode of operation using valley current mode control. The configuration of the circuit of FIG. 3B is similar to that of the circuit described in FIG. 3A with the following exceptions. Rather than providing the $V_{SUM}$ signal to the non-inverting input of PWM comparator 124, a signal $V_{RAMP}$ comprising the valley current sensing signal 360 is applied to PWM comparator 124. The current limit signal is provided from the output of a comparator 362 that is generated responsive to the receipt of an ILIM reference signal applied to the inverting input and the ISNS signal provided to the non-inverting input of the comparator 362 from the sensor 102. The ILIM reference may be from an internal voltage reference. Additionally, within the circuit configuration of FIG. 3B, the transistors 103 and 105 are omitted for the sake of clarity of the figure since these transistors remain turned "off" during the boost mode of operation. The input voltage $V_{IN}$ is applied at node 102 through ISNS current sensor 116.

Figure 4:
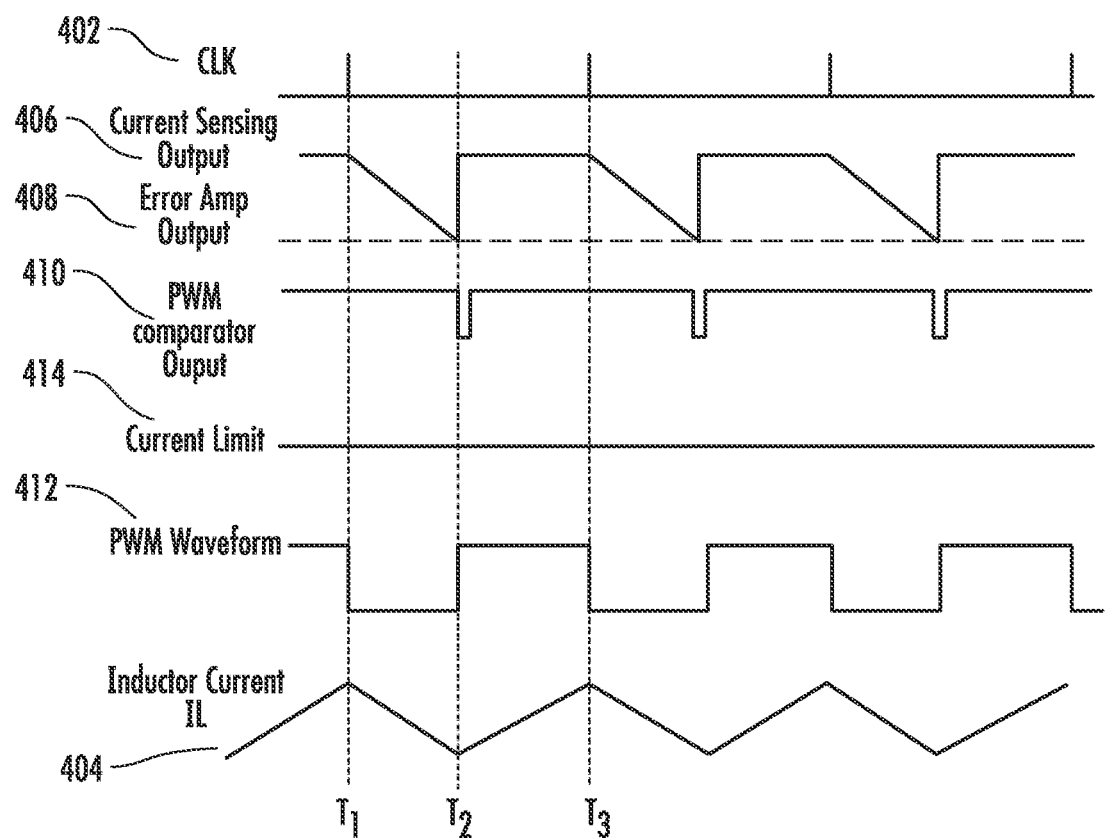
FIG. 4 illustrates various waveforms associated with the operation of the DC-DC converter in a valley current mode control.

Referring now also to FIG. 4, there is illustrated various waveforms associated with the operation of the DC-DC converters of FIGS. 3A and 3B in the boost mode of operation. The cycle is initiated responsive to the clock signal 402 going "high" at time $T_1$. Responsive to the rising edge of the clock signal 402 at time $T_1$, the switching transistor 111 is turned "off" and the switching transistor 109 is turned "on." This causes the inductor current 404 to begin decreasing from time $T_1$ to time $T_2$. As the inductor current 404 decreases from time $T_1$ to time $T_2$, the current sensing output 406 also decreases from time $T_1$ to time $T_2$. When the current sensing output 406 reaches the same value as the error amplifier output 408 (illustrated as a dotted line in FIG. 4) at time $T_2$ the SR latch 132 is set responsive to the PWM comparator output 410 going "low." When the SR latch 132 is reset this causes the PWM waveform provided from the output of the SR latch 132 to go "high" at time $T_2$, and the inductor current 404 begins increasing from time $T_2$ to time $T_3$, with transistor 111 being turned "on" and transistor 109 turned "off". If no current limit event is occurring as indicated by the current limit signal 414, the inductor current will increase from time $T_2$ to time $T_3$ until the next clock pulse is detected at time $T_3$. The process will then repeat.

Figure 5:
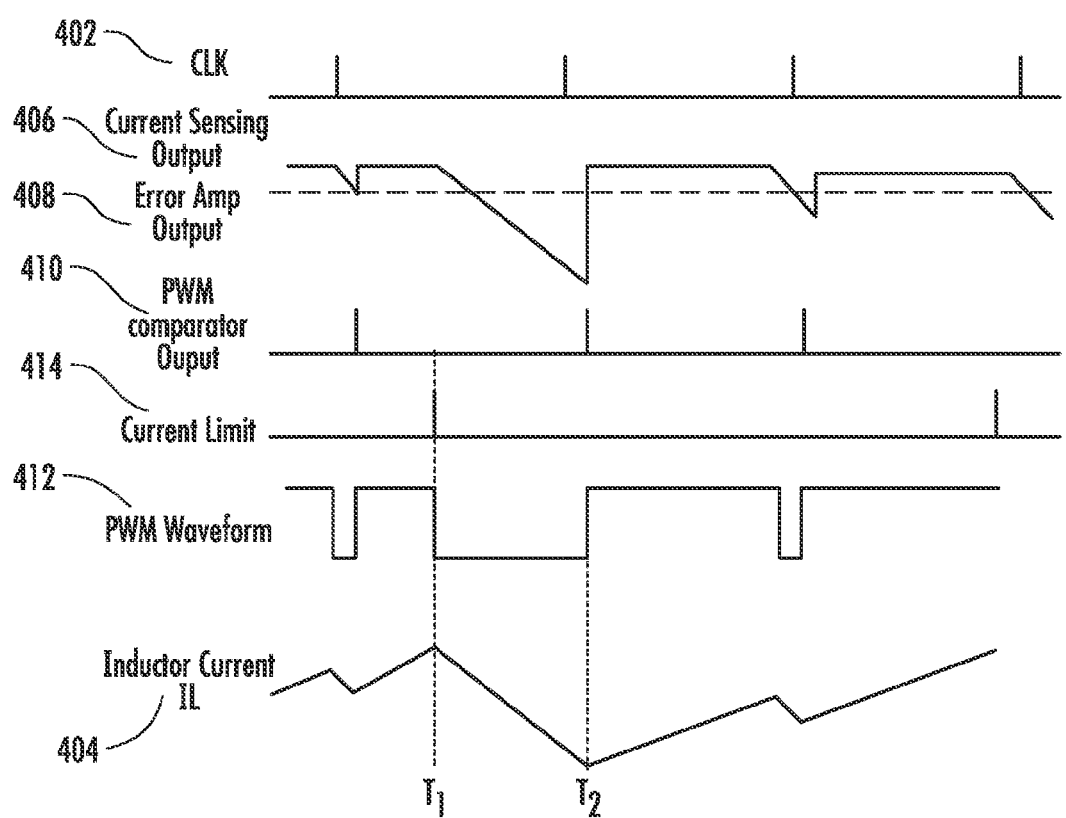
FIG. 5 illustrates various waveforms associated with the operation of the circuit of FIG. 3 in a valley current mode control with a current limit trigger.

Referring now also to FIG. 5, there is illustrated the valley current mode control operation of the buck-boost converter when the current limit 406 is triggered. When the inductor current 404 is higher than the current limit threshold, the current limit signal 414 pulses "high" at time $T_1$. This causes the switching transistor 109 to be turned "one" and the switching transistor 111 to be turned "off." This causes the inductor current to begin decreasing from time $T_1$ to time $T_2$. As discussed previously, the implementation of the current limit signal into this control scheme may be implemented in one of two ways as indicated generally at 310 and 312 with respect to FIG. 3. If the current limit signal is directly ANDed with the PWM signal as shown generally at 310, the waveforms as illustrated in FIG. 5 are presented. The problem with this scheme is that the switching frequency as illustrated by the PWM waveform 412 is greatly increased.

Figure 6:
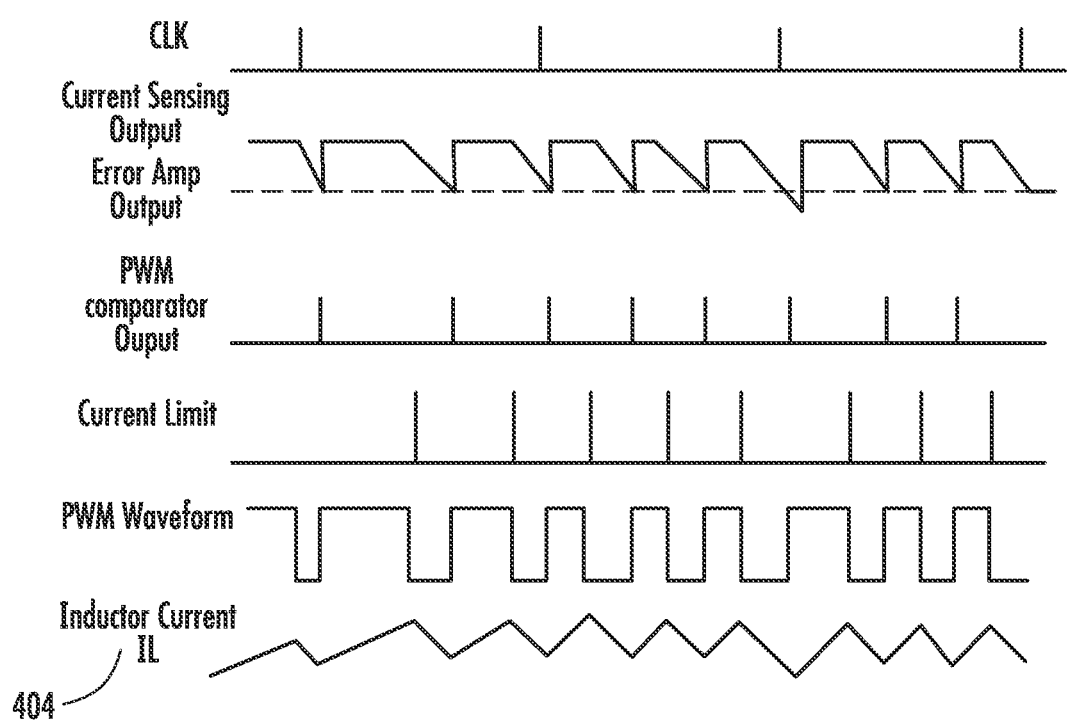
FIG. 6 illustrates various waveforms associated with the DC-DC converter of FIG. 3 in valley current control mode with the current limit trigger according to a second mode of operation.

In an alternative method utilizing the configuration associated with 312 of FIGS. 3A and 3B the current limit signal is latched using latch 314 with the clock signal as indicated generally at 312 in FIGS. 33A and 33B. The various waveforms associated with this configuration are illustrated in FIG. 6. While this configuration does not cause the frequency issues that are illustrated with respect to FIG. 5, this configuration causes a dramatic increase in the inductor ripple current as illustrated with respect to the inductor current waveform 404. This causes three significant problems. These include the inability to deliver current levels closest to the current limit value. A significant duty cycle disturbance and difficulty exiting the current limit (hysteretic entry and exit levels) also called a sticky current limit.

Figure 7A:
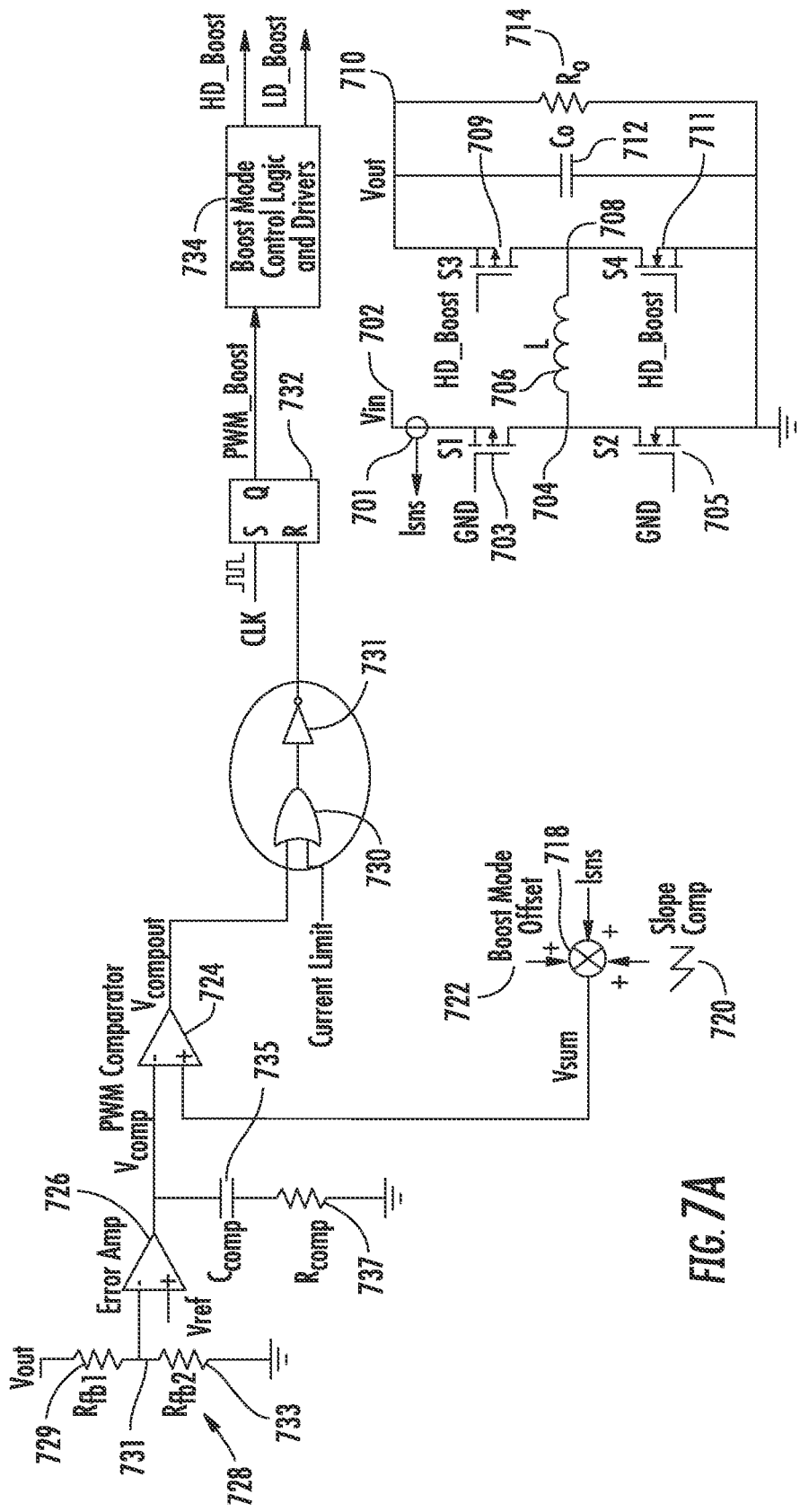
FIG. 7a illustrates a DC-DC converter having an improved boost mode of operation using a current limit signal.

Referring now to FIG. 7a, there is illustrated a new scheme for providing a current limit signal to a buck-boost converter that is operated within a valley current mode control boost operation. The input voltage $V_{IN}$ is applied at an input voltage node 702 to the source of a first switching transistor 703. The source/drain path of switching transistor 703 is connected between the input voltage node 702 and node 704. A second switching transistor 705 has its drain/source path connected between node 704 and ground. The gate of switching transistor 709 is connected to receive the HD_BOOST PWM control signal from control circuitry 707. The gate of transistor 711 is connected to receive the LD_BOOST PWM control signal from the control circuitry 707. Inductor 706 is connected between node 704 and node 708. Switching transistor 709 has its source/drain path connected between the output voltage node 710 and node 708. Switching transistor 703 has its drain/source path connected between input node 702 and node 704 and switching transistor 705 is coupled between node 704 and ground. The gates of each of switching transistors 703 and 705 are connected to ground when the buck-boost converter is in the boost mode of operation. The output capacitor 712 is connected between node 710 and ground, and a resistor 714 is connected in parallel with capacitor 712 between node 710 and ground.

A current sensor 701 monitors the input current at the input voltage node 702 and generates an input current sense voltage signal ISNS responsive thereto. The input current sense voltage ISNS is combined with a sloped compensation signal 720 and a boost mode offset signal 722 within a summation circuit 718. The compensation signal 720 is used for eliminating a sub-harmonic oscillation. The boost mode offset signal 722 is determined from a preset value. The summation circuit 718 combines the sensed current signal ISNS with the slope compensation signal 720 and the boost mode offset signal 722. The result of this combination provides a control signal VSUM which is provided to a non-inverting input of a PWM comparator 724. The inverting input of the PWM comparator 724 is connected to receive a voltage error signal $V_{COMP}$ from a GM amplifier 726. The GM amplifier 726 is connected to a resistor divider network 728 at its inverting input that monitors the output voltage $V_{OUT}$ provided from the output voltage node 710. The resistor divider 728 includes a first resistor 729 connected between the output voltage node 710 and node 731. A resistor 733 is connected between node 731 and ground. The non-inverting input of the GM amplifier 726 is connected to receive a reference voltage $V_{REF}$ to which the monitored output voltage from the resistor divider 728 is compared. The output of the GM amplifier is connected to a compensation circuit consisting of a series connection of a capacitor 735 and a resistor 737 connected between the output of the GM amplifier 726 and ground.

The output of the PWM comparator 724 provides a $V_{COMPOUT}$ signal to a first input of OR gate 730. The other input of OR gate 730 is connected to receive the current limit signal from a current limit comparator (not shown). An inverter 731 has its input connected to the output of OR gate 730 and its output connected to the R input of the SR latch 732. Since the current limit signal is ORed at OR gate 730 with the PWM comparator 724 output in the same manner as the peak current load control, as long as the current limit condition exists, the inductor current will be kept in a ramp down mode until exiting from the current limit condition. The current limit signal modulates the "off" time of the valley current mode control and replaces the output of the error amplifier when the current limit event occurs. The output of the SR latch from output Q is the PWM_BOOST signal that is provided to the buck mode control logic and driver 734. The boost mode control logic and drivers 734 generate the HD_BOOST and LD_BOOST signals that are provided to the gates of switching transistors 709 and 711 and control their switching during the boost mode of operation.

Figure 7B:
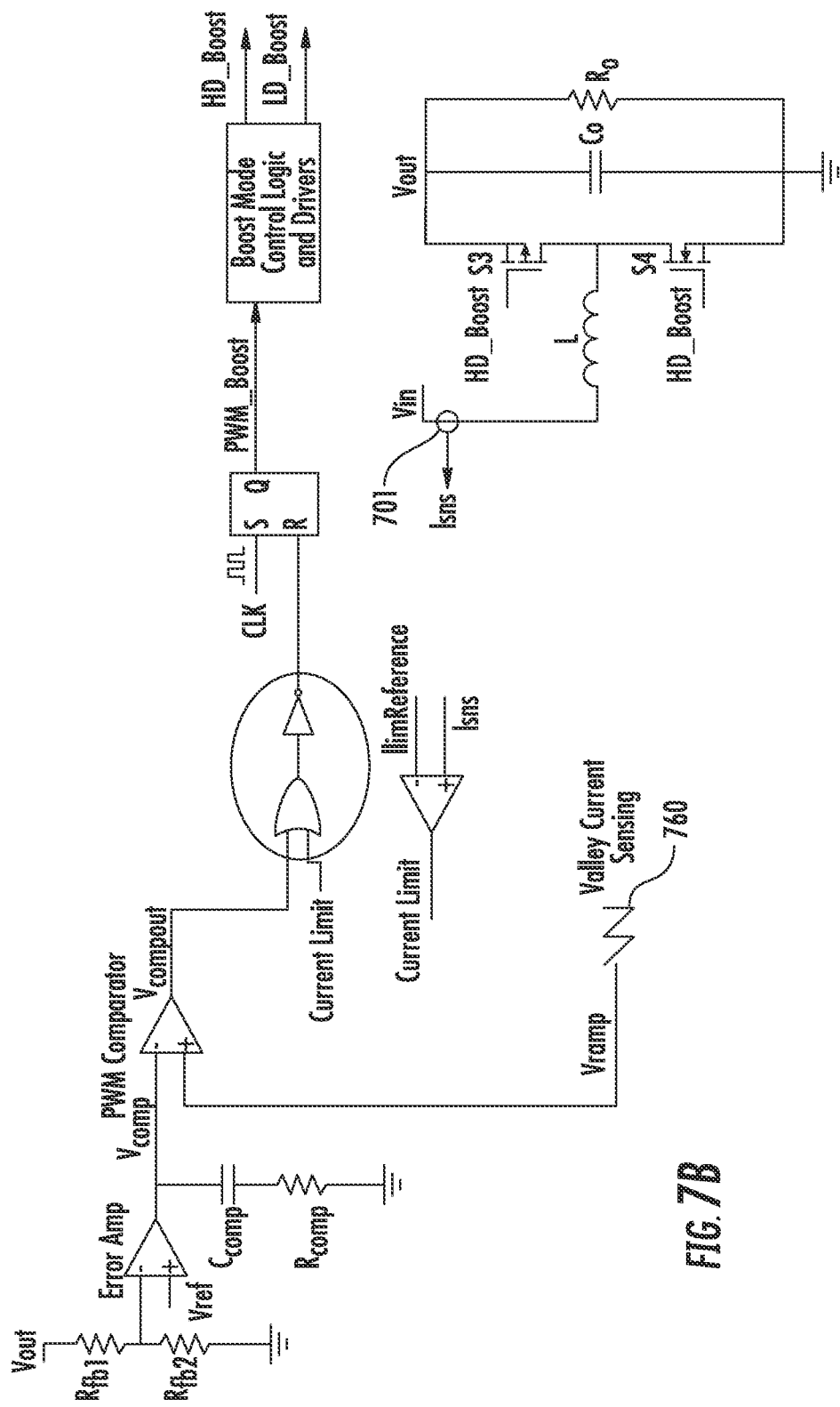

Referring now to FIG. 7B, there is illustrated a DC-DC converter in the valley current mode of operation. The configuration of FIG. 7B is the same as that in FIG. 7A with the following exceptions. The $V_{RAMP}$ signal is applied to the non-inverting input of PWM comparator 724 rather than the $V_{SUM}$ signal. The $V_{RAMP}$ signal comprises the valley current sensing signal 760. The current limit signal is generated from the output of a comparator 762 having its inverting input connected to the $L_{LIM}$ reference from the band-gap voltage reference macro and its non-inverting input connected to receive the ISNS signal from current sensor 701. Note the transistors 703 and 705 are not shown in FIG. 7B since in the boost mode the transistor 703 is turned "on" and transistor 705 is turned "off."

Figure 8:
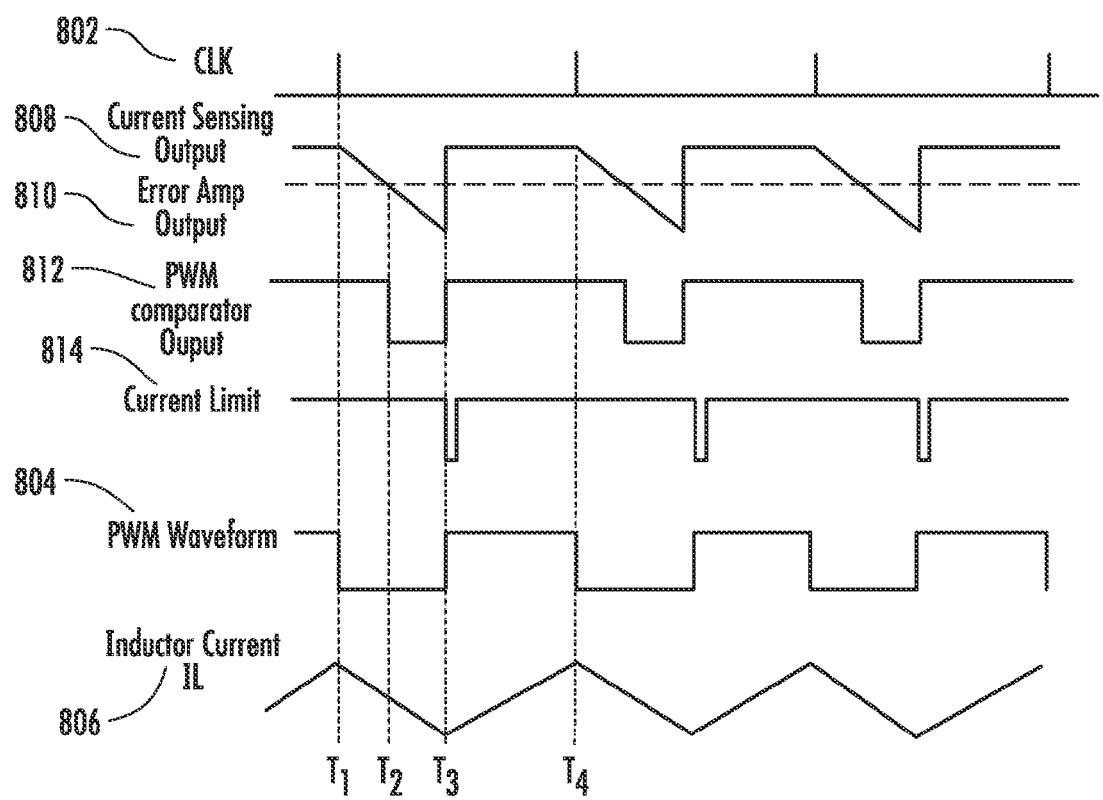
FIG. 8 illustrates various waveforms associated with the operation of the circuit of FIG. 7.

Referring now to FIG. 8, there are illustrated waveforms associated with the boost mode operation of the circuits of FIGS. 7A and 7B. Responsive to the clock signal 802 going "high" at time $T_1$, the PWM waveform provided from the SR latch 732 goes "low." This causes the upper switching transistor 709 to be turned "on" and the lower switching transistor 711 to be turned "off". This causes the inductor current $I_L$ 806 to begin decreasing from time $T_1$ to time $T_3$. As the inductor current $I_L$ 806 begins to decrease, the current sensing output 808 from the current sensor 701 also begins to decrease from time $T_1$ to time $T_3$. As the current sensor output 808 falls below the level of the error amplifier output 810, the output of the PWM comparator 724 will go "low" at time $T_2$. The PWM comparator output 812 will remain "low" as long as the current limit condition exists as indicated by the current limit signal 814 being at a logical "high" level. When the current limit signal 814 goes "low" at time $T_3$ indicating the end of the current limit event, the PWM waveform from latch 732 will go to a logical "high" level. This will cause transistor 709 to be turned "off" and transistor 711 to be turned "on" which will then cause the inductor current 806 to begin increasing from time $T_3$ to time $T_4$. At time $T_3$ the PWM comparator output 812 will also go to a logical "high" level responsive to the increasing inductor current 806 as will the current sensing output 808 detected by the current sensor 701. Thus, the current limit signal 814 is able to modulate the "off" time of the valley current mode control and replace the output of the error amplifier when the current limit event occurs. The inductor current 806 will continue increasing from time $T_3$ to time $T_4$ until a next clock pulse is received at time $T_4$ from the clock signal 802. Thus, when the current limit event happens, the PWM comparator's output signal is masked by the current limit comparator's output signal being logic HIGH most of the time except when current limit condition NOT occurs. Basically, when the current limit event happens, the current limit signal masks the PWM comparator's output signal and tries to reduce the inductor current. This is valley current control.

Thus, using the above described method during the boost mode of the buck-boost converter, the scheme will utilize the current limit signal that is ORed with the output of the PWM comparator. The current limit signal modulates the "off" time of the valley current mode control. This keeps both the switch frequency and the inductor ripple current constant for the buck-boost converter. The implementation also provides major advantages in that it delivers current levels close to the limit value, has no duty cycle disturbance and no difficulty exiting current limit (hysteretic entry and exit levels).

It will be appreciated by those skilled in the art having the benefit of this disclosure that this system and method for controlling buck-boost converter with current limit signal provides improved control while limiting switching frequency and inductor ripple current. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A DC-DC voltage converter, comprising:
   a pair of switching transistors providing an output voltage that are alternately switched in a boost mode of operation responsive to control signals;
   an inductor connected with the pair of switching transistors having an inductor current flowing therethrough, the inductor current having alternating peak current values and valley current values;
   a current sensor connected to monitor an input current generating a current sense signal; and
   control circuitry for generating the control signals to the pair of switching transistors responsive to the current sense signal, the output voltage and a current limit signal, the control circuitry having a valley current control mode of operation and a current limit function that is responsive to the valley current values of the inductor current.

2. The DC-DC voltage converter of claim 1, wherein the control circuitry further comprises current limit control circuitry for masking an output of a PWM comparator with an output of a current limit comparator responsive to a current limit event being detected by the current limit comparator in a valley current control mode.

3. The DC-DC voltage converter of claim 1, wherein the control circuitry further comprises:
   driver circuitry for generating the control signals responsive to a PWM signal;
   an error amplifier for comparing the output voltage with a reference voltage and generating an error voltage responsive thereto;
   a PWM comparator for comparing the error voltage with a reference voltage signal; and
   current limit control circuitry for masking an output of the PWM comparator with an output of the current limit comparator responsive to a current limit event being detected by the current limit comparator in the valley current control mode.

4. The DC-DC voltage converter of claim 1 further including a summation circuit for summing the current sense signal with an offset signal and a slope compensation signal to generate the voltage signal responsive to the current sense signal.

5. The DC-DC voltage converter of claim 1 further including a resistor divider connected to monitor the output voltage and providing an input to the error amplifier.

6. The DC-DC voltage converter of claim 1, wherein a current limit signal replaces an output signal of a PWM comparator when the current limit signal is at a logical high level.

7. The DC-DC voltage converter of claim 1, wherein the control circuitry generates the control signals to the pair of switching transistors in the boost mode of operation.

8. The DC-DC voltage converter of claim 1, wherein the current limit function modulates an "off" time of the valley current control mode of the DC-DC voltage converter based on a minimum value of an inductor current.

9. A DC-DC voltage converter, comprising:
a pair of switching transistors providing an output voltage that are alternately switched in a boost mode of operation responsive to control signals;
an inductor connected with the pair of switching transistors having an inductor current flowing therethrough, the inductor current having alternating peak current values and a valley current values;
a current sensor connected to monitor an input current generating a current sense signal;
control circuitry for generating the control signals to the pair of switching transistors responsive to the current sense signal, the output voltage and a current limit signal, wherein when the current limit signal indicates that the valley inductor current value exceeds a current limit the control signals configure the pair of switching transistors to decrease the inductor current; and
wherein the control circuitry further comprises:
driver circuitry for generating the control signals;
an error amplifier for comparing the output voltage with a reference voltage and generating an error voltage responsive thereto;
a PWM comparator for comparing the error voltage with a reference voltage signal;
a current limit comparator for comparing the monitored input current with a predetermined current limit level; and
current limit control circuitry for masking an output of the PWM comparator with an output of the current limit comparator responsive to a current limit event being detected by the current limit comparator in a valley current control mode.

10. The DC-DC voltage converter of claim 9 further including a summation circuit for summing the current sense signal with an offset signal and a slope compensation signal to generate the voltage signal responsive to the current sense signal.

11. The DC-DC voltage converter of claim 9 further including a resistor divider connected to monitor the output voltage and providing an input to the error amplifier.

12. The DC-DC voltage converter of claim 9, wherein current limit control circuitry controls the current limit signal to replace the output of the PWM comparator when the current limit signal is at a logical high level.

13. A method for controlling operation of a DC-DC voltage converter in a boost mode of operation, comprising the steps:
receiving an input voltage;
alternately switching a pair of switching transistors in a boost mode of operation responsive to control signals;
generating a current sense signal responsive to an input current;
comparing an output voltage with a reference voltage to generate an error voltage;
comparing a signal representative of an inductor current though an inductor connected to the pair of switching transistors with a predetermined level reference signal to generate a current limit signal indicating whether the inductor current through the inductor exceeds a predetermined level;
masking an output of the PWM comparator with an output of the current limit comparator responsive to the current limit signal indicating the inductor current exceeds the predetermined level in a valley current control mode; and
generating the control signals to the pair of switching transistors.

14. The method of claim 13 further including the step of summing the current sense signal with an offset signal and a slope compensation signal to generate the current sense responsive to the current sense signal.

15. The method of claim 13 further including the steps:
monitoring the output voltage using a resistor divider; and
providing the monitored output voltage to an input of an error amplifier.

16. The method of claim 13, wherein the masking step further includes the step of replacing the output of the PWM comparator with the current limit signal when the current limit signal is at a logical high level.

17. The method of claim 13, wherein the step of generating the control signals further comprises generating the control signals to the second pair of switching transistors in the boost mode of operation.

* * * * *